(12) United States Patent
Bax et al.

(10) Patent No.: US 7,544,231 B2
(45) Date of Patent: Jun. 9, 2009

(54) RECOVERY OF PLATINUM GROUP METALS

(75) Inventors: Alan Bax, West Perth (AU); Grenvil Marquis Dunn, Springs (ZA); John Derek Lewins, Mount Pleasant (AU)

(73) Assignee: Lonmin PLC, London (GB)

( * ) Notice: Subject to any disclaimer, the term of this patent is extended or adjusted under 35 U.S.C. 154(b) by 330 days.

(21) Appl. No.: 10/552,691

(22) PCT Filed: Apr. 8, 2004

(86) PCT No.: PCT/IB2004/001102

§ 371 (c)(1),
(2), (4) Date: Jul. 10, 2006

(87) PCT Pub. No.: WO2004/090178

PCT Pub. Date: Oct. 21, 2004

(65) Prior Publication Data

US 2007/0022843 A1    Feb. 1, 2007

(30) Foreign Application Priority Data

Apr. 11, 2003  (WO) .................. PCT/AU03/00435
Jul. 23, 2003   (ZA)  ................................ 2003/5682

(51) Int. Cl.
*C22B 3/12* (2006.01)
(52) U.S. Cl. .......................................................... 75/744
(58) Field of Classification Search .................... 75/744
See application file for complete search history.

(56) References Cited

U.S. PATENT DOCUMENTS

| 4,571,262 A | 2/1986 | Kerfoot et al. |
| 4,615,731 A * | 10/1986 | Thomas et al. ................. 75/353 |
| 2002/0152845 A1 | 10/2002 | Fleming et al. |

FOREIGN PATENT DOCUMENTS

| GB | 1153717 | 5/1969 |
| WO | WO 03/087416 A1 | 10/2003 |

OTHER PUBLICATIONS

Flett, Douglas, "Solution Purification" Hydrometallurgy, Jun. 1, 1992, pp. 327-344, vol. 30, Nos. 1/3, Amsterdam, NL.

* cited by examiner

*Primary Examiner*—Roy King
*Assistant Examiner*—Tim M McGuthry-Banks
(74) *Attorney, Agent, or Firm*—McCarter & English, LLP

(57) ABSTRACT

A process of recovering platinum group metals (PGMs) from a pregnant solution or leachate containing PGM values and base metals, typically a cyanide solution or leachate. A non-selective precipitation of the PGM values and base metals to form an insoluble precipitate comprising the PGM values and base metals is followed by selective leaching of the precipitate. The selective leaching forms a leach solution containing the base metals and a residue containing the PGM values, or a leach solution containing the base metals and PGM values and a depleted residue. The base metals are recovered from the leach solution and the PGM values are recovered from the residue or the leach solution, depending on the selective leaching. The non-selective precipitation of the PGM values and base metals is carried out by controlled reduction of the pH of the pregnant solution or leachate to a pH of about 2.

14 Claims, 10 Drawing Sheets

RECOVERY OF PLATINUM GROUP METALS

BACKGROUND OF THE INVENTION

This invention relates to a method of recovery of platinum group metals (PGMs) from a solution or leachate containing the PGMs and base metals, and to the production of a PGM concentrate suitable as a feed stock to a PGM refinery.

PGMs usually occur as discrete minerals, as dilute solid solutions in sulphide minerals, or are associated with silicates and/or chromitites. The processing of these materials consists of a combination of several unit operations, which ultimately produce individual PGMs—platinum, palladium, rhodium, ruthenium, iridium and osmium—plus gold and silver.

Currently PGM ores containing varying amounts of base metals, such as copper, nickel and cobalt, are crushed, milled and floated in flotation cells using reagents typically used for the recovery of base metal sulphides, to produce a low grade PGM concentrate. This flotation concentrate is dried and then smelted in an electric arc furnace where the PGMs are collected in the matte phase.

The molten furnace matte is transferred to a converter where flux is added and air blown into the bath so as to remove the iron as a slag. During the blowing process, the majority of the sulphur in the furnace matte is converted to sulphur dioxide and emitted as a gas.

The converter matte produced from the converting stage is either granulated or slow cooled. The granulated matte is milled and treated in a whole matte leach base metal removal circuit to separate nickel, copper, cobalt and iron from a PGM rich residue or concentrate. The base metals are sometimes refined to metal and in other plants produced as crude cathode and a semi pure nickel sulphate crystal, which contains iron and cobalt.

In cases where the matte is slow cooled, the magnetic fraction is processed as described above, while the non-magnetic fraction, which is the larger mass fraction, is treated to recover nickel and copper as sulphates leaving iron in an insoluble fraction. The iron residue can contain up to 20% of the original PGMs emanating from the converter step.

The high grade PGM concentrate is then treated in a precious metal refinery where the individual PGMs are separated and produced in pure metallic form.

A simplified flow sheet of the above process is shown in FIG. 1. This conventional processing route for PGMs has its limitations. It is considered suitable for sulphide containing ores from which relatively low quantities of flotation concentrates are produced with high recoveries of PGMs that can be treated economically through a smelter. However, ores that have been oxidised produce greater amounts of flotation concentrates to achieve the same PGM recoveries and this can lead to uneconomic smelting operations.

Concentrates containing relatively high levels of chromite also adversely affect smelting operations, resulting in high costs and lower recoveries.

The erection of new smelters to process PGM containing flotation concentrates has been significantly curtailed in recent years and has all but now been stopped due to very strict environmental legislation and prohibitively high capital costs. This means that any new operation will have to ship flotation concentrates excessively large distances to existing smelters, at high cost, leading to increased metal pipelines.

Environmental legislation is also forcing existing smelters to continually reduce the amount of sulphur dioxide being emitted to the atmosphere. This leads to on sulphur dioxide ($SO_2$) fixation plants and often with no revenue return. Significant benefit may therefore accrue were the smelting step to be eliminated.

SUMMARY OF THE INVENTION

A process of recovering platinum group metals (PGMs) from a pregnant solution or leachate containing PGM values and base metals, includes the steps of:

a) non-selective precipitation of the PGM values and base metals to form an insoluble precipitate comprising the PGM values and base metals;

b) selective leaching of the precipitate to form (i) a leach solution containing the base metals and a residue containing the PGM values, or (ii) a leach solution containing the base metals and PGM values and a depleted residue; and c) recovery of the base metals from the leach solution of b)(i) or b)(ii) and recovery of the PGM values from the residue of b)(i) or the leach solution of b)(ii), depending on the selective leaching in step b), wherein the pregnant solution or leachate containing the PGM values and base metals is a cyanide solution or leachate.

The pregnant solution or leachate containing the PGM values and base metals is preferably a cyanide solution or leachate.

The non-selective precipitation of the PGM values and base metals in step a) is preferably carried out by controlled reduction of the pH of the pregnant solution or leachate to within the range of about 0 to about 5, preferably about 1 to about 3, in particular about 2.

In one embodiment of the invention, the selective leaching in step b) is a pressure leaching step in which the PGM values remain in the residue. The PGM values are typically recovered from the residue by a fusion step or a further leach step to produce a concentrate rich in PGM values. The base metals are recovered from the leach solution, preferably through precipitation. Alteratively, the pressure leaching step may be carried out by first carrying out a caustic leach followed by an acid leach, in which case the PGM values may be recovered from the residue by, for example, a reduction leach step to produce a high grade PGM concentrate.

In an alternative embodiment of the invention, the insoluble precipitate of step a) is fumed with acid, followed by selective leaching to form a leach solution containing both the PGM values as anions and the base metals as cations, and recovery of the PGM values on an ion exchange resin, which is preferably incinerated to form an ash rich in PGM values or eluted to recover the PGM values. The base metals are preferably recovered from the leach solution by precipitation.

In a further alternative embodiment of the invention, the insoluble precipitate of step a) is first calcined and then selectively leached to remove the base metals, producing a PGM rich residue or concentrate. Again the base metals are preferably recovered from the leach solution by precipitation.

Any PGM values remaining in solution after the non-selective precipitation in step a) may be recovered by passing the solution through an ion exchange resin, as discussed above. Any base metals remaining in the solution may also be recovered, preferably by precipitation.

BRIEF DESCRIPTION OF THE DRAWINGS

The invention will now be described in more detail, by way of example only, with reference to the accompanying drawings, in which.

DETAILED DESCRIPTION OF PREFERRED EMBODIMENTS

The present invention provides a process to recover PGMs and base metals from a solution or leachate containing them, in particular a cyanide solution or leachate.

The cyanide leachate is produced through a known cyanide leach process. In this process, a flotation concentrate or an acid pressure leach residue material bearing platinum group metals such as platinum, palladium, rhodium, ruthenium, iridium and osmium, other precious metals such as gold and silver, and various base metals such as copper, nickel and cobalt, is contacted with a cyanide leach solution to solubilise the PGMs and the base metals. The resultant cyanide leachate may, if desired, be concentrated to form a concentrate rich in PGM and base metal complexes.

Figure 1:
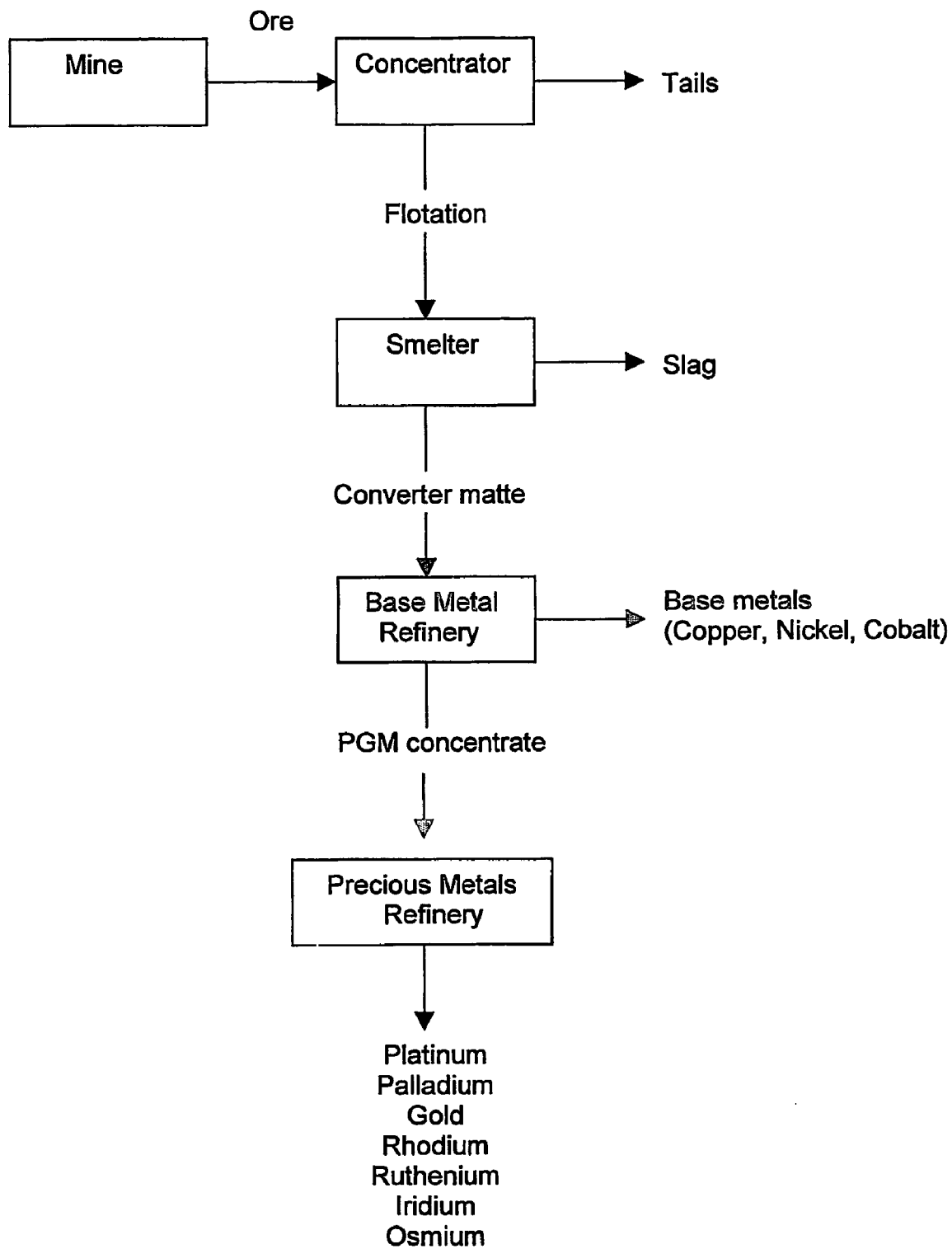
FIG. 1 is a flow sheet showing a prior art method of recovering PGMs.
Figure 2:
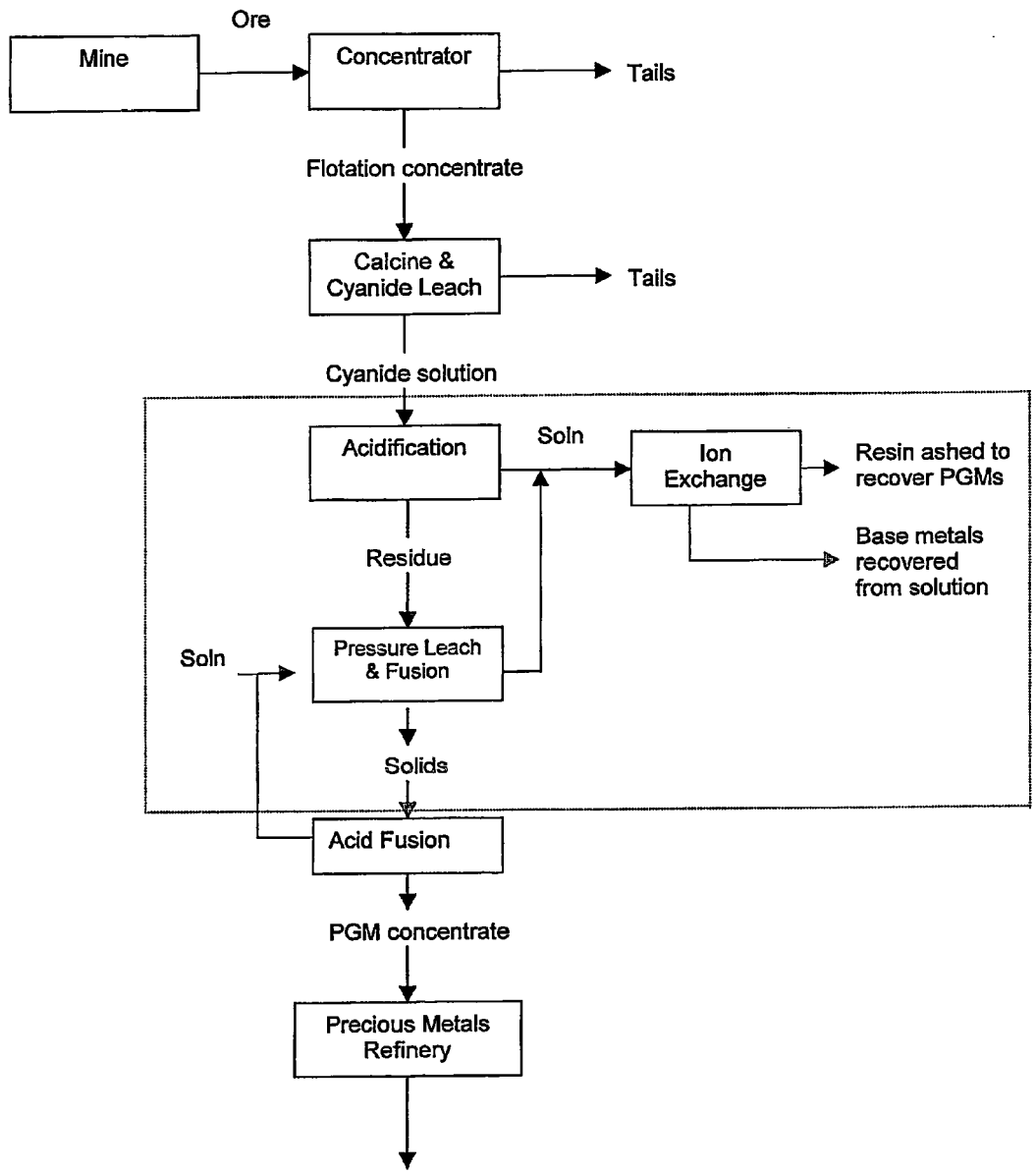
FIG. 2 is a flow sheet of an embodiment of the process of the present invention.

Referring to FIG. 2, in a first stage of the preferred process of the invention, the cyanide leachate is acidified with diluted sulphuric acid in a pH range of 0-5.0 and conducted at a temperature in the range of ambient to 95° C. The acidification is preferably done using 1:1 sulphuric acid at around pH 2 and 45° C. The acidification step can take up to 6 hrs.

The precipitation of the PGMs and base metals during acidification may be aided by controlled rates of addition of reagents such as sulphides in the form of sodium sulphide and sodium hydrogen sulphide or oxidants such as hydrogen peroxide and salts of peroxomonosulphuric acid (Caro's acid).

After acidification, the precipitated metals are recovered from solution by solid-liquid separation. Any cyanide released as hydrogen cyanide can be recovered in a scrubber.

The solution from the solid-liquid separation is passed through ion exchange columns where it is contacted with a resin that has functional groups that have stronger affinity for PGM complexes than the base metal complexes e.g. certain ammine groups. The PGM complexes bind to the resin in preference to certain base metal complexes of nickel, copper, cobalt and iron.

The ion exchange columns are typically arranged in a "lead-trail" configuration. As the lead column becomes exhausted by the loading of the PGM and base metal complexes, the PGM complexes displace some of the base metals as additional feed is provided to the lead column. The trail column(s) captures these base metal complexes, as the case may be, and so a partition is achieved between the PGMs and the base metals. Eventually the base metals are displaced from the ion exchange resin and pass out with the raffinate.

To recover the PGM values from the lead PGM column, a number of options are possible. The resin may be removed and ashed to produce a PGM product. Alternatively the resin may be eluted using an appropriate eluant to remove the PGM values.

To assist with the recovery of gold (Au), an ion exchange column loaded with a resin such as activated carbon is typically installed in the system.

Once the solution has passed through the ion exchange columns, the residual base metal values are preferably precipitated from solution using reagents such as caustic soda and/or sodium carbonate and sodium sulphide. The precipitated base metal products can then be recovered from solution by solid-liquid separation. Alternative methods such as ion exchange, solvent extraction and electrowinning can also be used to recover the base metal values.

The filtered precipitated residue from the initial step of acidification, also referred to as the acidification residue, may be repulped using filtrate from a later filtration step. Sulphuric acid is typically added to the repulping step. Any off-gas is scrubbed to recover hydrogen cyanide (HCN), which is recycled to the cyanide leaching stage.

The slurry from the repulping step is fed to a high-pressure vessel, typically a multi-compartment autoclave, where it is heated to a temperature of 140-220° C., preferably between 175 and 185° C. Oxygen is added counter currently to flush off any HCN into the vent from where it may be scrubbed. The autoclave is steam heated, directly or indirectly, and the pressure in the autoclave is maintained typically at 1500 kPa(g). The pulp density can be such as to yield a base metal concentrate varying from 10 to 180 g/l combined base metals, preferably 40-80 g/l. The autoclave retention time is between 1 and 6 hours, preferably 3 hours.

The discharge from the autoclave is cooled to approx 85° C. and flocculants such as Flocculant M351 added to aid settling before solid-liquid separation such as thickening and pressure filtration. After filtration, a solid product stream containing the PGMs and a filtrate stream are recovered.

There may be small quantities of precious metals in the filtrate stream and these can, after conditioning with a small quantity of chloride ions, be recovered on a simple ion exchange resin. The base metal complexes are weakly held by the ion exchange resin and ultimately get displaced. The chloride conditioning process employs typically 5 to 10 g/l of chlorides at 90 to 95° C. for approximately one hour.

The raffinate from the ion exchange step can be treated by a variety of means to recover the copper. These include:

Copper solvent extraction to remove the copper to an electrowin step;

Subject to the copper nickel ratio in the leachate, metathetically exchanged for nickel-copper sulphide matte at temperatures between 70 and 180° C., preferably 130-140° C. The copper sulphide fraction can be treated to recover copper by a leach-electrowin process; and Electrowinning and electrostripping of the copper to concentrations below 0.3 g/l copper.

The remaining nickel and cobalt in the raffinate stream after recovering the copper can be recovered by a variety of means. These include:

Sulphide precipitation either with hydrogen sulphide gas or sodium sulphide/hydro sulphide;

Crystallisation as nickel sulphate hexahydrate; and

Hydroxide/carbonate precipitation with magnesium hydroxide, sodium hydroxide, sodium carbonate.

The solids from the autoclave are dried to approximately 3-10% moisture using typical conventional dryers. The partially dried material is blended with concentrated sulphuric acid, typically in a cone mixer, which is heated indirectly to temperatures up to 350° C., preferably 280-310° C. The off-gas from this high temperature atmospheric leach step can be scrubbed to recover any sulphuric acid vapour. The reaction temperatures can be maintained for periods of up to 1½ hrs.

The slurry from the high temperature atmospheric leach step is drained into a dilution vessel where it is diluted to typically 100 g/l free sulphuric acid. The leach is maintained at temperatures up to 95° C. for typically 1 hr and then filtered using any suitable solid-liquid separation. The solid is washed before drying to produce a final concentrate rich in PGM values, typically assaying 15-85% PGM plus gold and silver, which may be refined in a conventional precious metal refinery to recover the PGM values.

The filtrate and wash liquor after recovering the PGM concentrate may be recycled to the repulping stage of the acidification residue.

Figure 3:
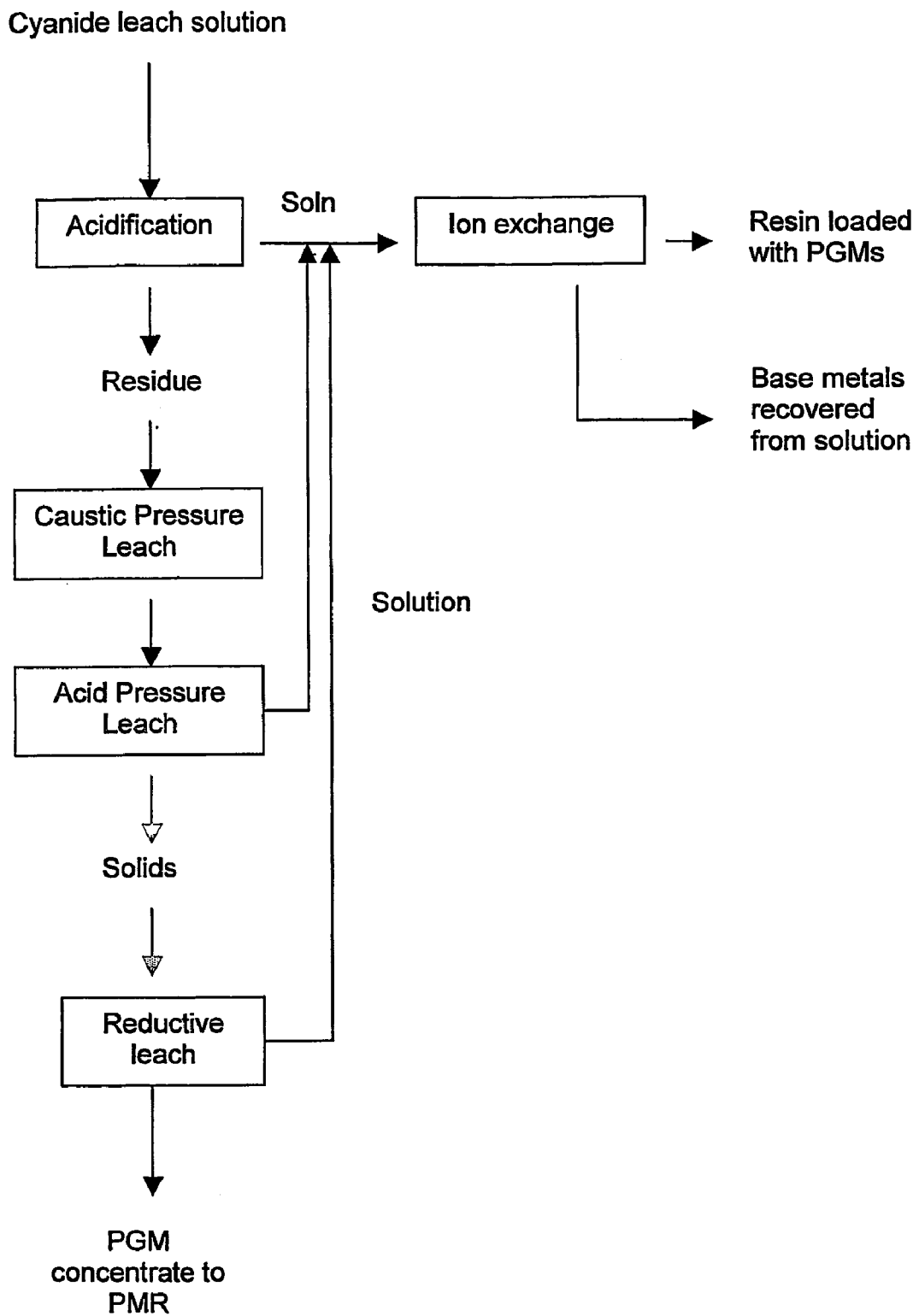
FIG. 3 is a flow sheet of an alternative embodiment of the process of the present invention.

In an alternative embodiment of the invention, pressure leaching of the acidification residue is conducted by first carrying out a caustic leach (sometimes referred to as 'oxydrolysis') followed by an acid leach as shown in FIG. 3. This alkali-acid combination leach is conducted to destroy the cyanide complexes and solubilise the base metals for subsequent recovery, typically as described above. The leachate from solid-liquid separation. is passed through a lead-trail ion exchange for the recovery of the precious metal values. The residue containing the PGM values may be reduction leached using a reductant such as formic acid to produce a high grade PGM concentrate suitable as a feed material to a conventional precious metal refinery.

Figure 4:
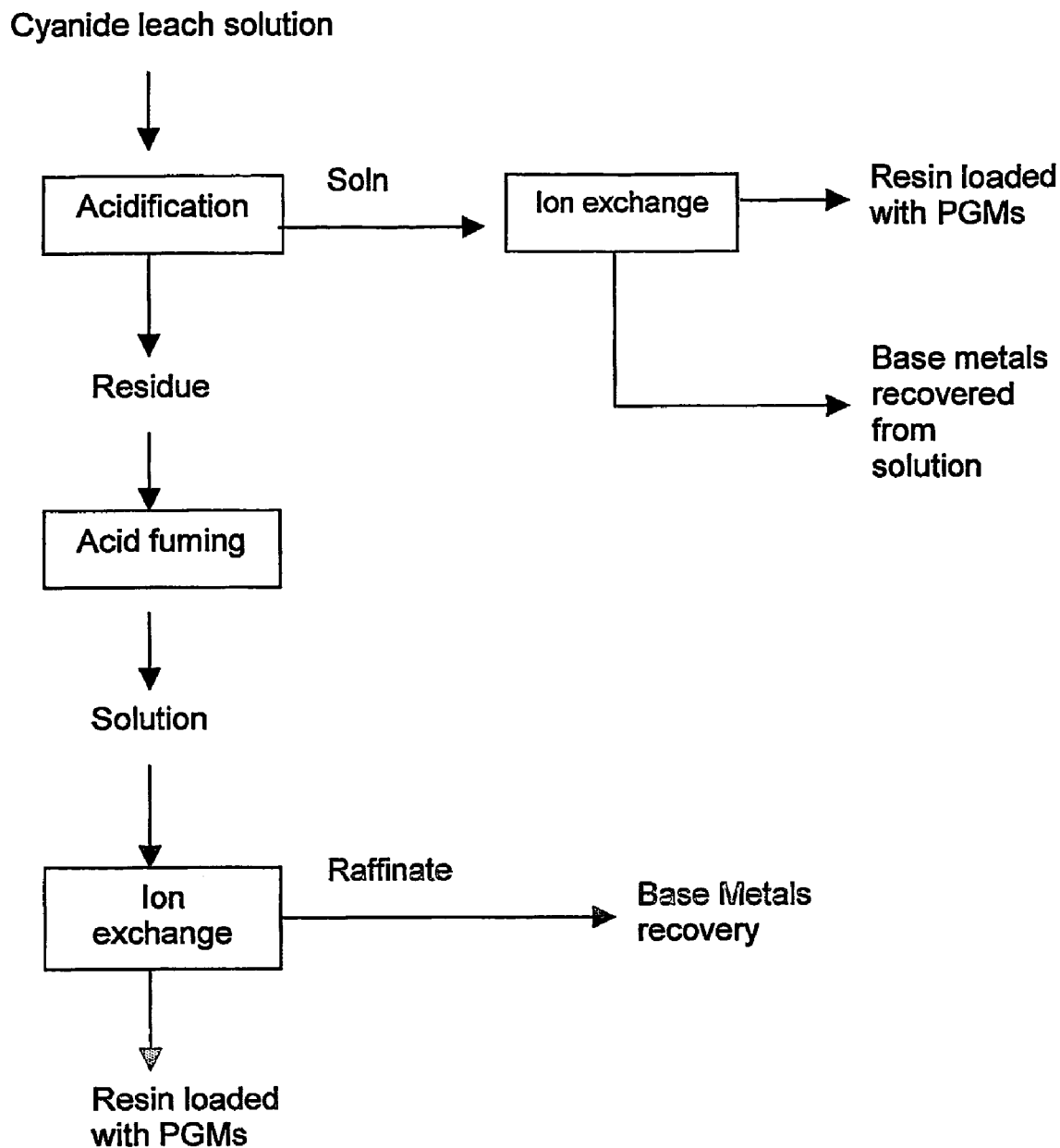
FIG. 4 is a flow sheet of a further alternative embodiment of the process of the present invention.

A further alternative embodiment of the invention comprises a sulphuric acid fusion of the acidification residue followed by a chloride leach using reagents such as chlorine, hydrochloric acid and sodium chlorine or a combination of some or all the reagents (FIG. 4). The fusion/leach is conducted to produce a solution containing both the PGM values (as anions) and base metals (as cations). The PGM values are recovered by passing the solution through anionic ion exchange resin columns and followed by elution or alternatively ashing the resins. The base metal values are recovered by any suitable known method such as ion exchange, solvent extraction, precipitation or electrowinning.

Figure 5:
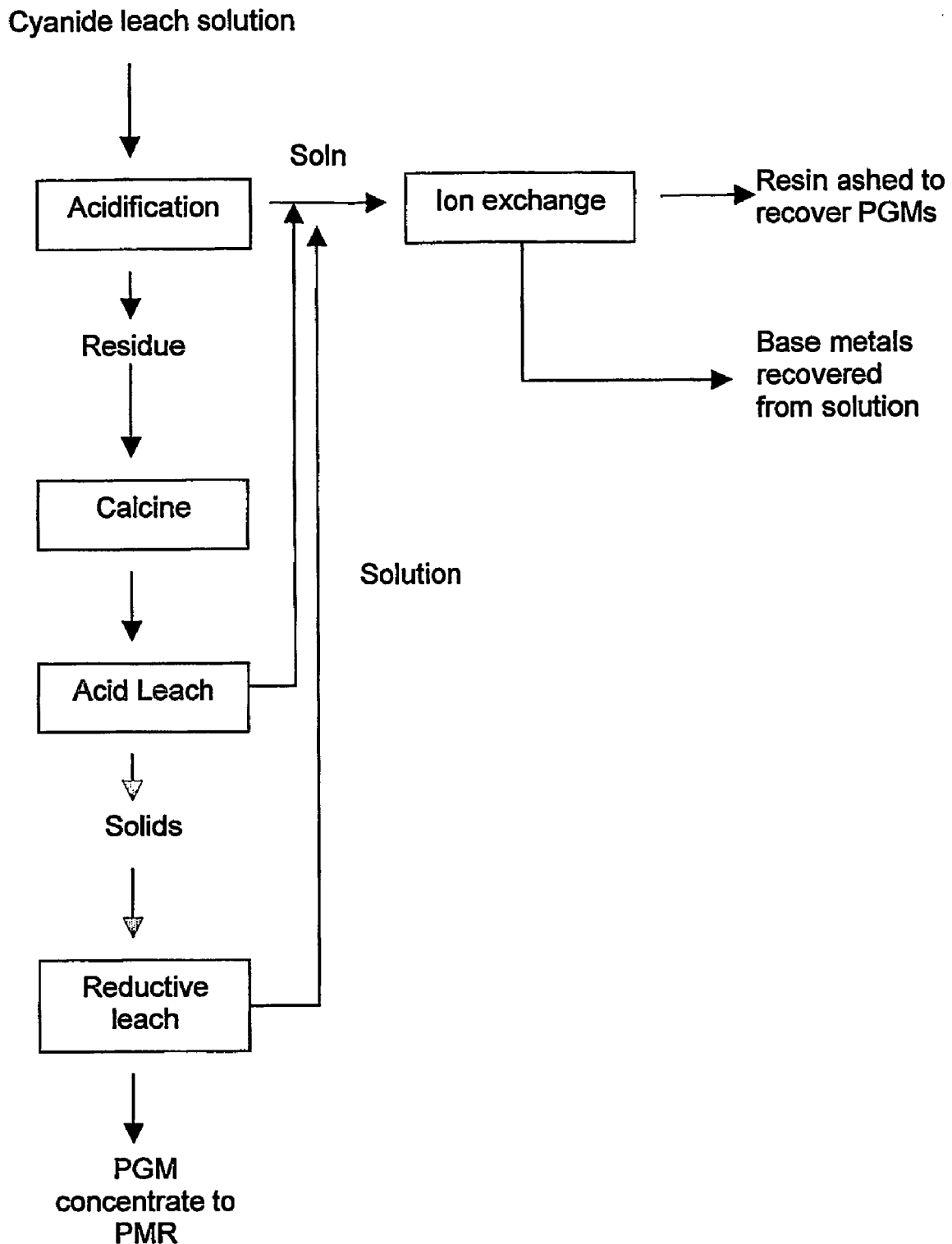
FIG. 5 is a flow sheet of another alternative embodiment of the process of the present invention.

In yet a further alternative embodiment of the invention, calcining of the acidification residue is conducted at a temperature between 250° C. and 800° C., but preferably between 400-600° C., prior to an acid leach (FIG. 5). The acid leach is conducted to solubilise the base metal values for subsequent recovery by any suitable known method. The PGM values remain in the residue and may be reductively leached to produce a high grade PGM concentrate.

Illustrative examples based on test work will now be presented to exemplify the present invention and should not be construed to limit the inventive method in any way. The test work is presented below in a series of tests which have been conducted either using cyanide leachate, acidification solution or acidification residue.

EXAMPLE 1

Precipitation with Sulphide at Raised Temperature

A test was conducted using NaHS to precipitate value metals from cyanide leachate at a raised temperature.

A cyanide leach solution was prepared by calcining underground flotation concentrate at 400° C. for 2 hrs in a muffle furnace and then leaching using 0.2% w/w sodium cyanide solution at 60° C. for 48 hrs, maintaining the pH at 9.5 with hydrated lime.

115% stoichiometric level of 20% w/v NaHS was added to 200 ml cyanide leach solution. $H_2SO_4$ was added to adjust the pH to 1 and the temperature maintained at 90° C. The solution was sampled after 120 minutes.

The test results are summarised in Table 1. It can be seen that good recoveries were achieved for Pt, Pd, Au, Cu and Co.

TABLE 1

Recoveries into Residue using NaHS

| | Metal | | | | | |
|---|---|---|---|---|---|---|
| | Pt | Pd | Au | Cu | Ni | Co |
| Recovery | 97.5% | 99.7% | 99.5% | 99.3% | 11.8% | 92.8% |

EXAMPLE 2

Precipitation with Sulphide at Ambient Temperature

A second series of tests was conducted on the cyanide leachate using NaHS over a range of pHs at ambient temperature to precipitate the value metals.

A cyanide leach solution was prepared by calcining a finely ground 'open cut' flotation concentrate at 400° C. for 2 hrs in a muffle furnace and then leaching using 0.2% NaCN solution at 60° C. for 48 hrs, maintaining the pH at 9.5.

115% stoichiometric level of 20% w/v NaHS solution was added to a series of 200 ml cyanide leach solutions, $H_2SO_4$ or NaOH was added to adjust the pH in the range 0.5-11.5. The reaction time was 5 mins.

Figure 6:
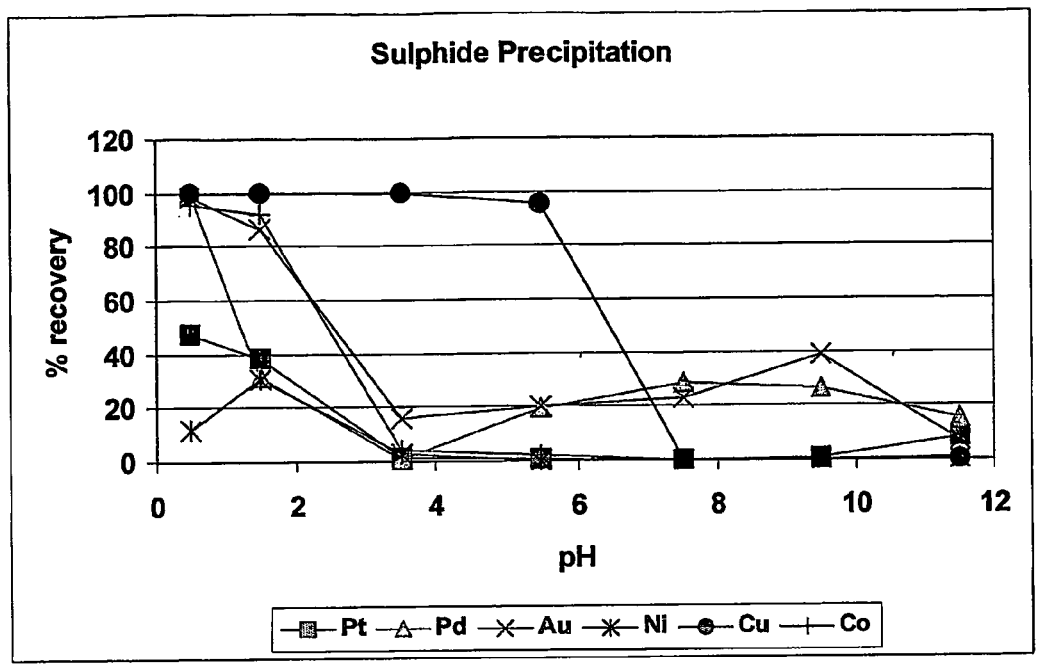
FIG. 6 is a graph that shows the effect of using NaHS over a range of pHs to precipitate PGMs and base metals.

FIG. 6 shows that good recoveries were obtained for Cu, Co, Pd and Au at low pH values. The test results have been summarised in Table 2.

TABLE 2

Sulphide Precipitation Metal Recoveries

| Precip pH | Cu (%) | Ni (%) | Co (%) | Fe (%) | Pt (%) | Pd (%) | Au (%) |
|---|---|---|---|---|---|---|---|
| 0.5 | 99.77 | 11.98 | 95.45 | 0.00 | 47.65 | 99.46 | 98.10 |
| 1.5 | 99.97 | 31.02 | 92.39 | 71.42 | 38.44 | 31.55 | 86.52 |
| 3.5 | 99.75 | 2.45 | 4.03 | 46.77 | 1.20 | 0.86 | 15.87 |
| 5.5 | 95.66 | 0.04 | 1.76 | 14.15 | 0.35 | 19.86 | 20.42 |
| 7.5 | 0.02 | 0.00 | 0.00 | 0.00 | 0.00 | 28.29 | 23.06 |
| 9.5 | 0.00 | 0.00 | 0.00 | 0.00 | 0.45 | 26.36 | 39.41 |
| 11.5 | 0.00 | 0.00 | 0.75 | 0.00 | 8.03 | 15.35 | 6.87 |

EXAMPLE 3

Precipitation using $H_2O_2$ and $Na_2S_2O_5$

A series of tests was conducted using $H_2O_2$ and $Na_2S_2O_5$ to precipitate the value metals from cyanide solution over a range of pH values.

A cyanide leach solution was prepared by calcining underground flotation concentrate at 400° C. for 2 hrs in a muffle furnace and then leaching using 0.2% NaCN solution at 60° C. for 48 hrs maintaining the pH at 9.5.

Hydrogen peroxide ($H_2O_2$) was added to the cyanide leach solution in the ratio of 1.5 mg/mg of $CN_{WAD}$ at ambient temperature and sulphuric acid was added to maintain the pH at set points between the ranges of 1-7. The reaction time was 120 min.

Sodium metabisulphate ($Na_2S_2O_5$) was then added in the ratio of 6 mg/mg of $CN_{WAD}$. Sulphuric acid was added to maintain the same pH. Again the reaction time was 120 min.

TABLE 3

Metal Recovery with $H_2O_2$ and $Na_2S_2O_5$ Treatment

| | | Metal removed from solution % | | | | | |
|---|---|---|---|---|---|---|---|
| Test | pH | Pt | Pd | Au | Cu | Ni | Co |
| $H_2O_2$ | 0.9 | 99.6 | 99.6 | 4.2 | 91.2 | 81.1 | 99.7 |
| $Na_2S_2O_5$ | 1.0 | 0 | 48.3 | 6.2 | 29.0 | 4.6 | 0 |
| Overall | | 99.6 | 99.8 | 10.2 | 93.8 | 82.0 | 99.7 |
| $H_2O_2$ | 3.2 | 97.9 | 97.9 | 1.6 | 98.9 | 93.8 | 91.8 |
| $Na_2S_2O_5$ | 3.0 | 25.0 | 50.0 | 3.9 | 76.4 | 15.9 | 18.8 |
| Overall | | 98.4 | 98.6 | 5.5 | 99.7 | 94.8 | 93.1 |
| $H_2O_2$ | 5.1 | 42.7 | 52.1 | 0 | 99.5 | 86.3 | 44.0 |
| $Na_2S_2O_5$ | 5.6 | 0 | 0 | 0 | 0 | 1.1 | 13.3 |
| Overall | | 42.7 | 52.1 | 0 | 99.5 | 86.4 | 51.5 |
| $H_2O_2$ | 7.1 | 21.8 | 31.5 | 0 | 95.3 | 71.8 | 15.4 |
| $Na_2S_2O_5$ | 7.1 | 2.8 | 2.5 | 8.2 | 0 | 0 | 12.3 |
| Overall | | 24.0 | 33.2 | 8.2 | 95.3 | 71.8 | 25.8 |

Figure 7:
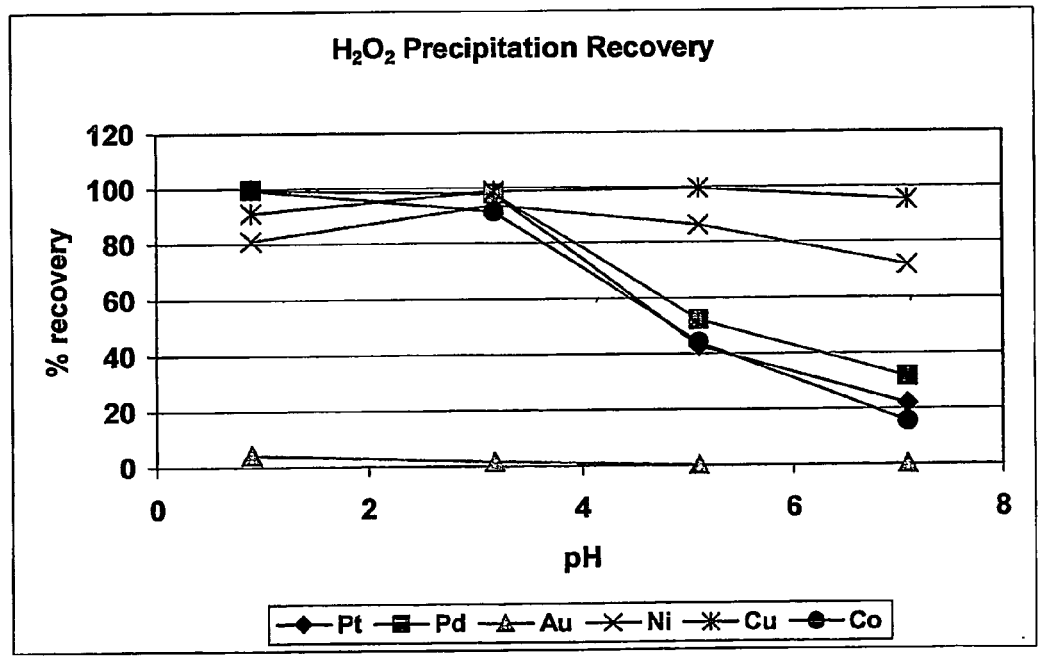
FIG. 7 is a graph that shows the effect of using $H_2O_2$ over a range of pHs on recoveries of PGMs and base metals.
Figure 8:
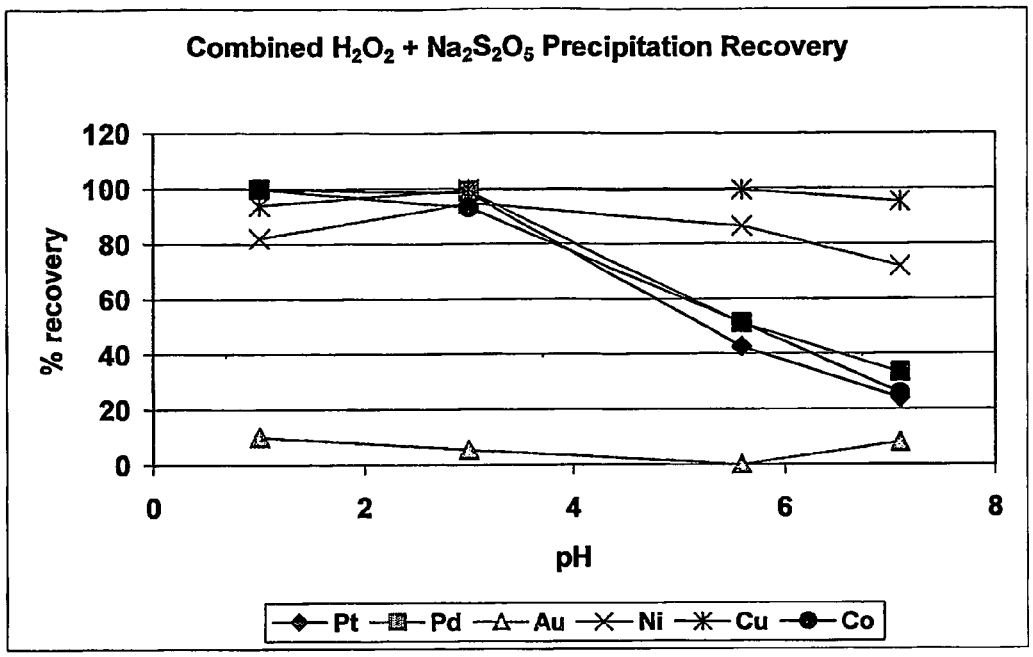
FIG. 8 is a graph that shows the effect of a combination of $H_2O_2$ and $Na_2S_2O_5$ at varying pHs on recoveries of PGMs and base metals.

Table 3 and FIGS. 7 and 8 show the effect of $H_2O_2$ only and a combination of $H_2O_2$ and $Na_2S_2O_5$, respectively, over a range of pHs on recoveries of PGMs and base metals. It can be seen that with the exception of Au, good recoveries of PGMs and base metals were obtained at pH values at and below 3.

EXAMPLE 4

Acidification of Cyanide Leachate

In a series of tests, a cyanide leachate of a PGM containing concentrate was acidified with 50% $H_2SO_4$ over a range of pHs from 0 to 5.

Cyanide leach solution was prepared by calcining underground flotation concentrate as per the previous examples. The alkaline cyanide leachate was warmed to 45° C. and while gently agitating, 1:1 $H_2SO_4$ was added slowly. Once the required pH was reached, the solution was allowed to stand while a precipitate formed. The pH was checked and readjusted to the target value. Flocculant M351 was added and allowed to stand for 3 hours without agitation.

Figure 9:
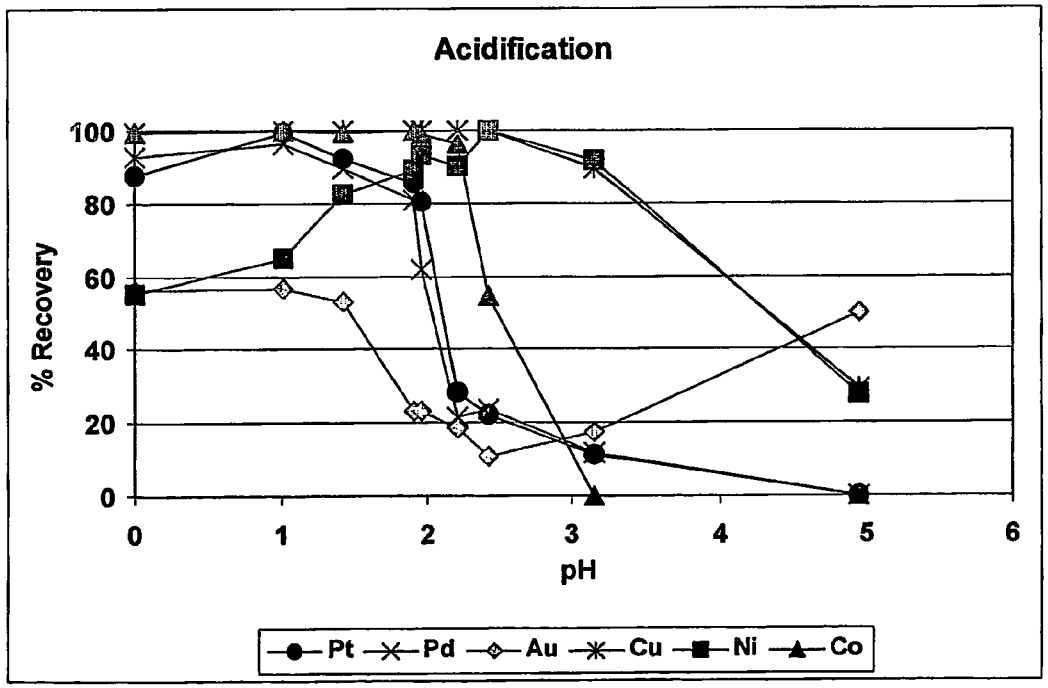
FIG. 9 is a graph that shows the effect of using sulphuric acid over a range of pHs on recoveries of PGMs and base metals from cyanide leachate.

The concentration trends are shown in Table 4, and Table 5 shows the recovery of value material to the precipitate. PGM recovery to the precipitate was optimised at a pH of approximately 1.0. At pH2, the base metal residuals were at a maximum and then commenced redissolving. A similar trend was observed for the PGMs below a pH of 1.0. FIG. 9 trends the precipitated component at various pH's.

TABLE 4

Effect of Variable pH.

| Test no | pH | Pt | Pd | Au | Cu ppm | Ni | Co | Fe |
|---|---|---|---|---|---|---|---|---|
| Feed 1 | | 4.21 | 5.58 | 1.95 | 1910 | 3970 | 17 | 32 |
| Leachate | 4.95 | 4.56 | 5.85 | 0.98 | 1350 | 2875 | 26 | 27 |
| Feed 2 | | 3.42 | 2.62 | 0.75 | 862 | 1240 | 15 | 1250 |
| Residue 1 | 3.15 | 3.04 | 2.31 | 0.62 | 87 | 102 | 32 | 2.8 |
| Residue 2 | 2.41 | 2.66 | 2 | 0.67 | 1 | 1 | 6.8 | 2.3 |
| Feed 3 | | 3.3 | 3.53 | 1.3 | 1380 | 1950 | 50 | 6.8 |
| Leachate 1 | 2.2 | 2.37 | 2.77 | 1.06 | 1.56 | 196 | 1.74 | 0.22 |
| Leachate 2 | 1.95 | 0.64 | 1.35 | 1 | 3.53 | 132 | 0.55 | 0.17 |
| Leachate 3 | 1.9 | 0.47 | 0.68 | 1 | 2.22 | 207 | 0.1 | 0.21 |
| Leachate 4 | 1.42 | 0.26 | 0.37 | 0.61 | 1.51 | 343 | 0.15 | 0.29 |
| Leachate 5 | 1.01 | 0.01 | 0.13 | 0.56 | 2.36 | 688 | 0.09 | 0.76 |
| Leachate 6 | 0 | 0.41 | 0.25 | 0.57 | 9.76 | 872 | 0.23 | 0.57 |

TABLE 5

Effect of pH on value material recovery

| Test | pH | Pt | Pd | Au | Ni | Cu | Co |
|---|---|---|---|---|---|---|---|
| 1 | 0.01 | 86.7 | 92.9 | 56.2 | 55.3 | 99.3 | 99.5 |
| 2 | 1.01 | 99.7 | 96.3 | 56.9 | 64.7 | 99.8 | 99.8 |
| 3 | 1.42 | 92.1 | 89.5 | 53.1 | 82.4 | 99.9 | 99.7 |
| 4 | 1.90 | 85.8 | 80.7 | 23.1 | 89.4 | 99.8 | 99.8 |
| 5 | 1.95 | 80.7 | 61.8 | 23.1 | 93.2 | 99.8 | 98.9 |
| 6 | 2.2 | 28.2 | 21.5 | 17.6 | 89.9 | 99.9 | 96.5 |
| 7 | 2.41 | 22.1 | 23.7 | 18.5 | 99.9 | 99.9 | 54.7 |
| 8 | 3.15 | 11.1 | 11.8 | 10.7 | 91.8 | 89.9 | <1 |
| 9 | 4.95 | <1 | <1 | 49.7 | 27.6 | 29.3 | <1 |

EXAMPLE 5

Recovery of PGM Values from Filtrate after Acidification using Ion Exchange Resin In this test, filtrates from Example 4 were subjected to ion exchange using a single quaternary ammonium ion exchange resin and a cation ion exchange resin.

A three column circuit was employed with the first two columns charged with IRA-402 (an anionic resin) and with the final column equipped with an activated carbon. A total of 190 litres of pregnant liquor was passed through the circuit and the results are given in Table 6.

TABLE 6

Ion exchange on pH2 Filtrate

| | Bed Volumes | Composition (mg/L) | | | | | | |
|---|---|---|---|---|---|---|---|---|
| | | Au | Pt | Pd | Cu | Ni | Fe | Co |
| Pregnant Liquor | — | 0.8 | 1.57 | 1.62 | <1.0 | 180 | <1 | <1 |
| Lead Column | 760 | 0.55 | <0.01 | <0.01 | <1 | 293 | 1.5 | <1 |
| | 3714 | 1.07 | 0.32 | 0.15 | <1 | 433 | 4.0 | <1 |
| | 9820 | 0.62 | 0.28 | 0.67 | <1 | 267 | 1.2 | <1 |
| Trail Column | 9820 | 0.47 | <0.01 | 0.17 | <1 | 246 | 2.0 | <1 |

The composition of the resins after ashing is shown in Table 7.

TABLE 7

Composition of Ion Exchange Resins after ashing

| | Composition % * | | | | | | |
|---|---|---|---|---|---|---|---|
| | Au | Pt | Pd | Cu | Ni | Fe | Co |
| Lead Column #1 | 1.3 | 16.5 | 21.3 | 23.7 | <1.3 | <1.3 | 34.6 |
| Lead Column #2 | 5.6 | 43.2 | 43.1 | 4.4 | <3.1 | 3.8 | 24.4 |
| Trail Column | 21.7 | <13 | <13 | <3.3 | 10.0 | 35.0 | <3.3 |

* Calculated from mass load net of ash

The first bed column had been kept in duty beyond its optimal cut point and was loading strongly held copper and cobalt complexes. Table 7 provides confirmation that a high grade PGM ash can be derived from the resin while Table 6 confirms that low raffinate PGM values can be derived employing the resin suite of IRA-402 and an activated carbon.

EXAMPLE 6

Recovery of PGM Values from Filtrate after Acidification using Ion Exchange Resin In this test, the filtrate from the pH2 acidification step was passed through a series of ion exchange columns with the aim to saturate and analyse the resin in the lead column.

Cyanide leach solution was prepared in a pilot plant run where calcined underground flotation concentrate, produced from a rotary kiln heated to 400-425° C. and residence time of 2 hrs, was leached with NaCN in a 5 stage cascading circuit with a retention time of 100 hrs at a pH around 9.2 and temperature of 60° C. The solution was heated to 45° C. before being pumped to a 3 stage cascading circuit with a retention time of 3-5 hours. Sulphuric acid solution of 500 g/l $H_2SO_4$ was added to the first tank to maintain the pH at 2.

The filtered solution from the acidification step was then pumped at a flow rate of approximately 40 l/hr and 20° C. into a series of ion exchange columns. The resin charges of the columns were as follows:

| Column 1 | 2 liters IRA 402 CL |
| Column 2 | 2 liters IRA 402 CL |
| Column 3 | 2 liters activated carbon type CQ 006-12X40 |
| Column 4 | 2 liters IRA 402 CL |

The resin was equilibrated with 12 bed volumes of pH1 aqueous sulphuric acid prior to feeding pH2 filtrate.

After 5850 litres (2925 bed volumes) of pH2 filtrate had been processed, platinum and palladium were still loading whilst gold was being displaced and absorbed further down in the fourth column. The raffinate profiles for column 1 are shown in Table 8.

TABLE 8

Raffinate profiles for column 1.

| Day | Pt | Pd | Au | Cu |
|---|---|---|---|---|
| | | ppb | | |
| Feed (ave) | 530 | 610 | 900 | 5200 |
| 1 | 330 | 360 | 680 | 500 |
| 2 | | | | |
| 3 | 5 | 65 | 100 | 500 |
| 4 | 5 | 20 | 257 | 500 |
| 5 | 5 | 5 | 563 | 500 |
| 6 | 5 | 5 | 1027 | 500 |
| 7 | 5 | 5 | 1097 | 500 |
| 8 | 5 | 5 | 717 | 500 |
| 9 | 35 | 68 | 633 | 500 |
| 10 | 43 | 110 | 653 | 500 |
| 11 | 83 | 87 | 837 | 500 |
| 12 | 72 | 85 | 930 | 500 |
| 13 | 105 | 115 | 1045 | 500 |
| 14 | 127 | 140 | 1073 | 500 |
| 15 | 147 | 177 | 1020 | 500 |
| 16 | | | | |
| 17 | 187 | 207 | 1510 | 500 |

The load profiles for Pt, Pd, Au and Cu are shown in Table 9.

No Co or Ni absorption was measured for both the ion exchange resin and the activated carbon.

TABLE 9

Loading profiles for column 1

| DAY | Pt | Pd | Au | Cu |
|---|---|---|---|---|
| | | Grams | | |
| 1 | 0 | 0 | 0 | 0.174 |
| 2 | | | | |
| 3 | 0.128 | 0.113 | 0.232 | 0.174 |
| 4 | 0.320 | 0.300 | 0.462 | 1.481 |
| 5 | 0.608 | 0.566 | 0.637 | 1.481 |
| 6 | 0.968 | 0.849 | 0.737 | 1.582 |
| 7 | 1.288 | 1.107 | 0.797 | 2.342 |
| 8 | 1.487 | 1.299 | 0.830 | 2.860 |
| 9 | 1.641 | 1.464 | 0.880 | 3.665 |
| 10 | 1.779 | 1.603 | 0.911 | 4.653 |
| 11 | 1.874 | 1.663 | 0.928 | 5.185 |
| 12 | 2.029 | 1.760 | 1.070 | 5.396 |
| 13 | 2.171 | 1.842 | 1.085 | 5.629 |
| 14 | 2.311 | 1.917 | 1.138 | 5.860 |
| 15 | 2.413 | 1.973 | 1.148 | 5.860 |
| 16 | 2.565 | 2.073 | 1.159 | 5.860 |
| 17 | 2.622 | 2.092 | 1.073 | 6.019 |

Figure 10:
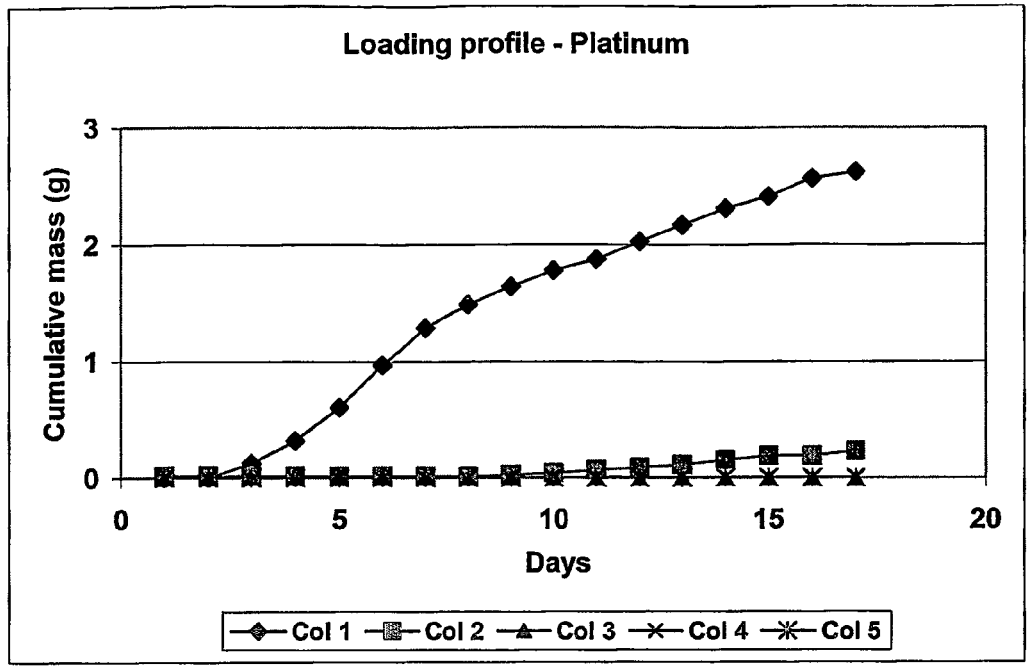
FIG. 10 is a graph that shows the loading profile of platinum on the resins in a five-column pilot ion exchange circuit.
Figure 11:
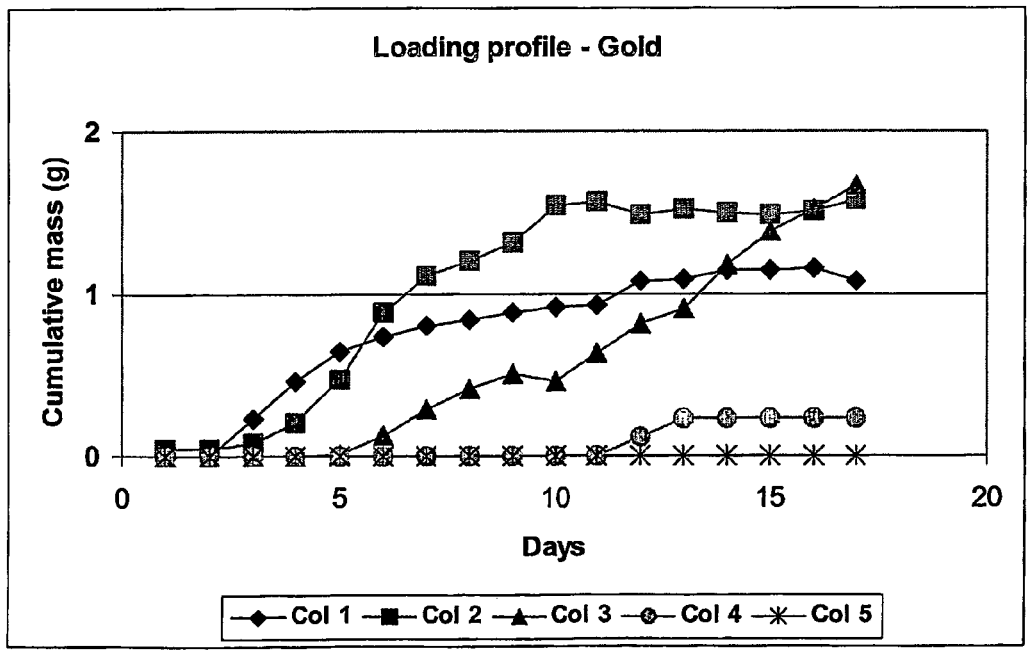
FIG. 11 is a graph that shows the loading profile of gold on the resins in a five-column pilot ion exchange circuit.

The load profiles for platinum and palladium are similar with the blend of IRA-402 and activated carbon employed as exchangers in the multi-column circuit. FIG. 10 shows the load profile for platinum from pH2 leachates in the five-column lead-trail pilot ion exchange campaign. FIG. 11 shows gold is not as strongly bound to the resin functional groups as platinum The average concentration of the resin in column 1 after the pilot run is shown in Table 10.

TABLE 10

Average composition of resin in column 1

| | Ppm |
|---|---|
| Pt | 93580 |
| Pd | 104821 |
| Au | 55480 |

EXAMPLE 7

Recovery of PGM Values from Acidification Residue by Acid Fuming and Ion Exchange A series of tests were conducted to absorb PGM values onto an ion exchange resin from a solution following an acid fusion on acidification residue.

Wet acidification residues, as prepared in Example 4, were mixed with 1:1 $H_2SO_4$ in the ratio of 1.5 $H_2SO_4$:1 wet cake, boiled down for 15 mins till white fumes were evolved and diluted with water (500 ml/100 gm wet cake) before chlorine gas was bubbled through at 70° C. The solutions were then progressively passed through a single column containing 10 ml IRA 402 resin.

A second set of tests were done by fuming with $H_2SO_4$, diluting and then adding sodium chloride (about 15 g NaCl per 100 g wet cake). Again the solutions were progressively passed through the resin.

The results have been summarised in Table 11. It can be seen that selective extraction of PGMs took place over the base metals. However, Pt and Au absorbed preferentially to Pd once the resin became saturated. The analysis of the resin revealed values of Pt at 5.83 g/l and Pd at 6.68 g/l.

TABLE 11

Ion Exchange results from Acid Fuming-Leach Filtrates

| | Volume ml | bv Cum | Au | Pt | Pd mg/l | Cu | Ni | Co | Dissolution method |
|---|---|---|---|---|---|---|---|---|---|
| Feed 1 | | | 0.17 | 12.9 | 25.1 | 8180 | 16400 | 457 | $H_2SO_4/Cl_2$ |
| Raffinate | 0-80 | 8 | <0.01 | 1.83 | 0.59 | 7370 | 14680 | 417 | |
| Feed 2 | | | <0.01 | 3.79 | 13.8 | 6420 | 8560 | 207 | $H_2SO_4/Cl_2$ |
| Raffinate | 80-160 | 16 | <0.01 | 1.20 | 0.20 | 5910 | 9480 | 223 | |
| Feed 3 | | | 1.10 | 10.1 | 22.9 | 5720 | 14300 | 232 | $H_2SO_4/Cl_2$ |
| Raffinate | 160-235 | 24 | <0.01 | 0.91 | 0.20 | 5420 | 13400 | 223 | |
| Feed 4 | | | 0.20 | 0.20 | 8.89 | 2545 | 5795 | 215 | $H_2SO_4/Cl_2$ |
| Raffinate | 235-310 | 31 | <0.01 | 0.36 | 0.15 | 2670 | 5850 | 201 | |
| Feed 5 | | | 0.23 | 0.42 | 13.0 | 3990 | 3080 | 205 | $H_2SO_4/Cl_2$ |
| Raffinate | 310-385 | 39 | <0.01 | 0.23 | 0.14 | 3870 | 3430 | 205 | |
| Feed 6 | | | 0.12 | 1.01 | 12.7 | 3060 | 2580 | 205 | $H_2SO_4/Cl_2$ |
| Raffinate | 385-460 | 46 | <0.01 | 0.21 | 0.15 | 3190 | 2650 | 206 | |
| Feed 7 | | | 0.12 | 0.11 | 2.77 | 1210 | 2380 | 105 | $H_2SO_4/Cl_2$ |
| Raffinate | 460-535 | 54 | <0.01 | 0.08 | 0.07 | 1520 | 2440 | 117 | |
| Feed 8 | | | 0.12 | 11.7 | 64.5 | 21058 | 23091 | 710 | $H_2SO_4/Cl_2$ |
| Raffinate | 535-660 | 66 | <0.01 | 0.31 | 1.32 | 19931 | 22021 | 673 | |
| Raffinate | 660-765 | 77 | <0.01 | 0.47 | 2.56 | 22545 | 25112 | 787 | |
| Feed 9 | | | 1.53 | 39.0 | 64.5 | 12200 | 9600 | 3620 | $H_2SO_4/Cl_2$ |
| Raffinate | 765-845 | 85 | <0.01 | 0.28 | 0.64 | 13800 | 13800 | 410 | |
| Feed 10 | | | 1.92 | 84.0 | 156 | 25300 | 38300 | 760 | $H_2SO_4/Cl_2$ |
| Raffinate | 845-985 | 99 | <0.01 | 0.23 | 1.51 | 24600 | 35000 | 720 | |
| Feed 11 | | | 0.87 | 58.5 | 104 | 21900 | 22200 | 760 | $H_2SO_4/Cl_2$ |
| Raffinate | 985-1170 | 117 | <0.01 | 0.26 | 2.27 | 22100 | 23400 | 770 | |
| Feed 12 | | | 1.29 | 32.0 | 46.0 | 11275 | 15274 | 432 | $H_2SO_4/Cl_2$ |
| Raffinate | 1170-1320 | 132 | 0.2 | 0.37 | 5.3 | 11197 | 15172 | 442 | |
| Raffinate | 1320-1540 | 154 | 0.08 | 0.31 | 9.7 | 11450 | 15395 | 435 | |
| Feed 13 | | | 0.11 | 10.4 | 8.96 | 6360 | 7580 | 308 | $H_2SO_4/Cl_2$ |
| Raffinate | 1540-1740 | 174 | 0.05 | 0.10 | 13.3 | 6690 | 8320 | 325 | |
| Raffinate | 1740-1940 | 194 | 0.04 | 0.08 | 16.1 | 6380 | 7630 | 315 | |
| Feed 14 | | | 0.75 | 30.5 | 25.0 | 10800 | 12000 | 610 | $H_2SO_4/NaCl$ |
| Raffinate | 1940-2145 | 215 | 0.07 | 0.14 | 30.7 | 10800 | 12100 | 611 | |
| Raffinate | 2145-2315 | 232 | 0.02 | 0.36 | 43.7 | 11800 | 12400 | 638 | |
| Feed 15 | | | 0.34 | 17.40 | 29.4 | 15000 | 15550 | 608 | $H_2SO_4/NaCl$ |
| Raffinate | 2315-2515 | 252 | <0.01 | 1.22 | 51.3 | 14800 | 15100 | 633 | |
| Feed 16 | | | 0.10 | 16.9 | 25.1 | 12000 | 13000 | 492 | $H_2SO_4/NaCl$ |
| Raffinate | 2515-2745 | 275 | <0.01 | 0.78 | 31.5 | 12300 | 12300 | 497 | |

EXAMPLE 8

Recovery of PGMs from High Pressure/High Temperature Leach in a Two Stage Alkaline/Acid Medium Followed by Ion Exchange A series of tests were conducted by subjecting the pH2 acidification residue to a two-stage alkaline/acid leach at varying pressures and temperatures from 10-20 bar (1000-2000 kPa) and 150-200° C., respectively.

Acidification residue was prepared as described in Example 4 and slurried with water in an autoclave and then steam heated to the required temperature. A weighed amount of caustic soda (NaOH) was added. The autoclave was pressurised to the set pressure and left to react for 2-4 hrs. A set volume of $H_2SO_4$ was then added and again left for 1-2 hrs. The conditions for the two-stage leaches are shown in Table 12.

TABLE 12

Alkali and acid pressure leach conditions

| Test | Feed Max (9) | pH (max) | Caustic Leach Conditions ||||| Acid Leach Conditions |||||
|---|---|---|---|---|---|---|---|---|---|---|---|
| | | | NaOH (g) | Time (h) | Pres kPa(g) | Temp °C. | pH (min) | $H_2SO_4$ (g) | Time (h) | Pres kPa(g) | Temp °C. |
| 1 | 26.5 | 12.4 | 165 | 2 | 2000 | 200 | 1.3 | 318.3 | 2 | 2000 | 200 |
| 2 | 28.9 | 12.2 | 150 | 4 | 1000 | 155 | 1.2 | 98.6 | 1 | 1000 | 155 |
| 3 | 424.3 | 11.8 | 190 | 4 | 2000 | 200 | 2.6 | 192.8 | 2 | 2000 | 200 |
| 4 | 551.2 | 9.84 | 500 | 4 | 1400 | 150 | 2.31 | 493.2 | 2 | 1400 | 150 |
| 5 | 641.1 | 12.1 | 200 | 4 | 2000 | 182 | 1.35 | 448.4 | 2 | 2000 | 182 |
| 6 | 616 | 9.87 | 240 | 4 | 1700 | 170 | 1.4 | 493.2 | 1 | 1700 | 170 |

The results are shown in Table 13. Mass reductions in excess of 95% were achieved with residue PGM grades over 3%.

TABLE 13

Alkali and acid pressure leach results

| Test | Residue Ppm (%) |||||| Deportment to Residue % ||||||
|---|---|---|---|---|---|---|---|---|---|---|---|---|
| | Pt | Pd | Au | Cu | Ni | fe | Pt | Pd | Au | Cu | Ni | fe |
| 1 | (0.54) | (1.09) | 8.46 | (3.45) | (8.96) | (39.7) | 100 | 100 | 4 | 1 | 4 | 119 |
| 2 | (0.57) | (0.69) | 5.15 | (6.23) | (9.92) | (27.5) | 100 | 100 | 0 | 3 | 3 | 45 |
| 3 | 842 | 963 | 3.51 | (15.1) | (16.40) | (9.52) | 87 | 90 | 12 | 97.5 | 76.8 | 100 |
| 4 | 1660 | 1890 | 7.57 | (17.2) | (18.30) | (0.67) | 100 | 100 | 28 | 90.5 | 62.1 | 77 |
| 5 | (0.39) | (2.09) | 7.43 | (33.3) | (9.37) | 1.24 | 75 | 77 | 7 | 38.8 | 8.2 | 100 |
| 6 | (1.63) | (1.86) | 25.8 | (22.9) | (8.03) | (5.00) | 100 | 100 | 9 | 8.6 | 2.2 | 45 |

The solutions generated by the pressure leaches were progressively passed through 10 ml IRA 402 resin. The pH of the feed solutions varied between 0.49 and 5.83.

The results are summarised in Table 14. It can be seen that selective extraction of PGMs was achieved over the base metals. Pt and Pd extractions were good at all pH values, but Au slippage seemed more pronounced at high pH.

TABLE 14

Ion Exchange results from a two-stage Alkaline/Acid Leach filtrate

| | | | Leach | | | | | | | | |
|---|---|---|---|---|---|---|---|---|---|---|---|
| | Volume ml | bv Cum | Press (bar) | Temp °C. | pH Feed | Au | Pt | Pd | Cu mg/l | Ni | Co |
| Feed 1 | | | 20 | 200 | 0.54 | 0.03 | 0.66 | 0.08 | 641 | 1065 | 16 |
| Raffinate | 2450-4600 | 460 | | | | <0.01 | <0.01 | <0.01 | 634 | 1090 | 18 |
| Feed 2 | | | 20 | 200 | 1.42 | 0.09 | 0.20 | 0.03 | 796 | 1180 | 42 |
| Raffinate | 6110-7290 | 729 | | | | <0.01 | <0.01 | 0.01 | 832 | 1200 | 43 |
| Feed 3 | | | 10 | 150 | 0.56 | <0.01 | <0.01 | 0.02 | 747 | 978 | <1 |
| Raffinate | 9460-10860 | 1086 | | | | <0.01 | <0.01 | 0.02 | 777 | 1020 | <1 |
| Feed 4 | | | 10 | 155 | 1.09 | 0.02 | 0.25 | 0.26 | 498 | 655 | <1 |
| Raffinate | 13020-13570 | 1357 | | | | <0.01 | <0.01 | 0.05 | 501 | 700 | <1 |
| Feed 5 | | | 10 | 155 | 1.28 | 0.31 | 0.43 | 0.80 | 1965 | 2060 | <1 |
| Raffinate | 15420-18030 | 1803 | | | | <0.01 | <0.01 | 0.03 | 1720 | 1650 | 17 |
| Feed 6 | | | 15 | 182 | 1.62 | 0.06 | 0.81 | 1.41 | 1700 | 1600 | 16 |
| Raffinate | 18030-21310 | 2131 | | | | <0.01 | <0.01 | 0.02 | | | |
| Feed 7 | | | 15 | 182 | 0.53 | 0.02 | 0.15 | 0.45 | 732 | 781 | 13 |
| Raffinate | 21310-24390 | 2439 | | | | <0.01 | <0.01 | 0.02 | 850 | 847 | 13 |
| Feed 8 | | | 20 | 200 | 0.49 | 0.29 | 0.06 | 0.12 | 2500 | 1810 | 80 |
| Raffinate | 24390-28150 | 2815 | | | | <0.01 | <0.01 | <0.01 | 2460 | 1800 | 78 |
| Feed 9 | | | 10 | 155 | 1.06 | 0.32 | 1.24 | 2.19 | 1700 | 3890 | <1 |
| Raffinate | 28150-30400 | 3040 | | | | 0.04 | <0.01 | <0.01 | 1960 | 4350 | 3.3 |
| Feed 10 | | | 10 | 155 | 0.94 | 0.29 | 0.26 | 2.07 | 1350 | 2030 | 2.7 |
| Raffinate | 30400-33800 | 3380 | | | | 0.03 | <0.01 | 0.01 | 1790 | 2870 | 5.4 |
| Feed 11 | | | 10 | 155 | 1.52 | 0.25 | 0.65 | 1.28 | 2660 | 3225 | <1 |
| Raffinate | 33800-35350 | 3535 | | | | 0.03 | <0.01 | <0.01 | 2990 | 2690 | <1 |
| Feed 12 | | | 20 | 200 | 0.66 | 0.07 | 0.09 | 0.06 | 1990 | 2340 | 83 |
| Raffinate | 35350-36650 | 3665 | | | | 0.03 | 0.03 | 0.04 | 1990 | 2340 | 78 |
| Feed 13 | | | 20 | 200 | 4.68 | 0.07 | 0.09 | 0.06 | 151 | 1800 | 68 |
| Raffinate | 36650-39560 | 3956 | | | | 0.07 | <0.01 | <0.01 | 30 | 2580 | 80 |
| Feed 14 | | | | | 1.02 | 0.11 | 0.65 | 1.58 | 8190 | 10500 | 222 |
| Raffinate | 39560-40810 | 4081 | | | | 0.05 | 0.03 | <0.01 | 10200 | 14100 | 322 |
| Feed 15 | | | 20 | 150 | 3.32 | 2.21 | 5.98 | 4.35 | 482 | 10100 | 15 |
| Raffinate | 40810-43660 | 4366 | | | | 0.88 | 0.39 | 0.39 | 206 | 10120 | <1 |
| Feed 16 | | | | | 0.72 | 1.17 | 1.53 | 0.51 | 7165 | 9935 | 19 |
| Raffinate | 43660-45210 | 4521 | | | | 0.28 | 0.02 | 0.15 | 7180 | 9760 | <1 |
| Feed 17 | | | | | 2.74 | 2.34 | 5.49 | 1.28 | 328 | 8480 | 13 |
| Raffinate | 45210-48810 | 4881 | | | | 3.26 | 2.64 | 0.79 | 794 | 5290 | 13 |
| Feed 18 | | | | | 5.83 | 1.88 | 3.64 | 1.59 | 515 | 18400 | 34 |
| Raffinate | 48810-50660 | 5066 | | | | 2.80 | 2.32 | 1.06 | 335 | 18310 | 35 |
| Feed 19 | | | | | 4.14 | 1.29 | 2.18 | 0.82 | 6870 | 20000 | 432 |
| Raffinate | 50660-52310 | 5231 | | | | 0.40 | 0.06 | 0.04 | 6570 | 16800 | 513 |
| Feed 20 | | | | | 1.92 | 1.47 | 1.04 | 0.23 | 13700 | 21000 | 524 |
| Raffinate | 52310-53620 | 5362 | | | | 0.48 | 0.10 | 0.07 | 11500 | 15300 | 430 |
| Feed 21 | | | | | 3.68 | 1.74 | 0.67 | 0.55 | 23700 | 28100 | 417 |
| Raffinate | 53620-56670 | 5667 | | | | 0.40 | 0.08 | 0.09 | 18200 | 26650 | 463 |
| Feed 22 | | | | | 0.69 | 0.82 | 0.62 | 0.42 | 22500 | 23700 | 350 |
| Raffinate | 56670-58350 | 5835 | | | | | | 3 | 19400 | 24900 | 417 |
| Feed 23 | | | | | 0.72 | 4.02 | 6.93 | 4.42 | | | |
| Raffinate | 58350-62100 | 6210 | | | | 3.02 | 1.74 | 3 | | | |

EXAMPLE 9

Recovery of PGM Values from pH2 Acidification Residue by Calcining and Leaching In this series of tests, a pH2 acidification residue was calcined at varying temperatures and then leached at high temperature and pressure. The calcine temperature varied from 250° C. to 800° C. and the calcined material was leached using dilute sulphuric acid at 6 bar (600 kPa) and 140° C. for 4 hours.

Figure 12:
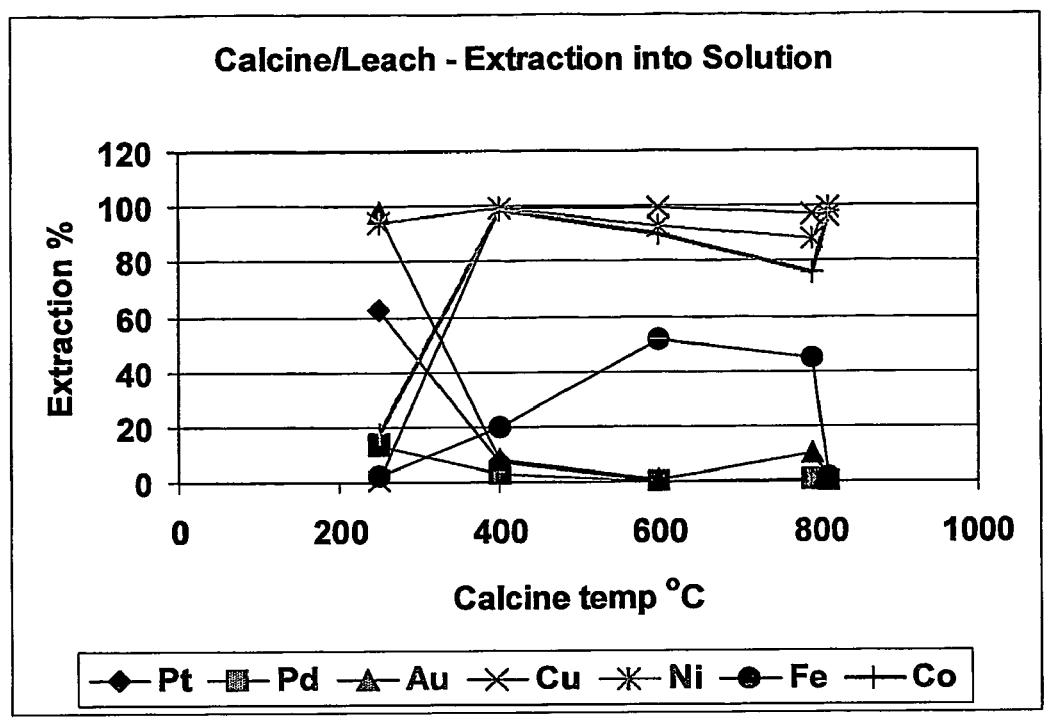
FIG. 12 is a graph that shows the effect of temperature of calcination on the leaching extraction of PGMs and base metals.

FIG. 12 shows the effect of calcining temperature on the extraction of value metals. It can be seen that good separation is effected at a calcine temperature between 400-600° C. where the PGM values remain in the residue and the base metal values essentially report to the solution. The results are summarised in Table 15.

TABLE 15

Extraction into solution during Leaching after Calcining

| Calcine | | Leach | | | | | | | | | |
|---|---|---|---|---|---|---|---|---|---|---|---|
| Temp | | $H_2SO_4$ | Pres | Temp | Time | \multicolumn{7}{c}{Extraction into solution %} |
| °C. | Atm | g/l | kPa(t) | °C. | hr | Pt | Pd | Au | Cu | Ni | Fe | Co |
| 250 | Air | 30.48 | 600 | 140 | 4 | 62.6 | 13.3 | 98.2 | 1 | 94.4 | 2.5 | 17.4 |
| 400 | Air | 30.48 | 600 | 140 | 4 | 7.1 | 2.7 | 8.4 | 99.5 | 99.6 | 19.8 | 98.3 |
| 600 | Air | 30.48 | 600 | 140 | 4 | 0.1 | 0.1 | 0.9 | 99.2 | 92.5 | 51.9 | 89.9 |
| 800 | Air | 30.48 | 600 | 140 | 4 | 1.1 | 0.4 | 10.1 | 97.0 | 88.5 | 45.1 | 75.6 |
| 800 | CO | 30.48 | 600 | 140 | 4 | 0.1 | 0.3 | 1.2 | 96.1 | 99.4 | 1.8 | 98.1 |

EXAMPLE 10

Recovery of PGM Values from pH2 Acidification Residue by Acid Leaching and Fusion In this series of tests, a pH2 acidification residue was leached with sulphuric acid under varying conditions of temperature and pressure. The residue from the leaching step was mixed with concentrated sulphuric acid and heated to 300° C. for 60 minutes (fusion step).

The pH2 acidification residue produced from the pilot plant testwork in Example 5 was weighed (800 gm wet, 380-410 gm dry) into an autoclave and slurried with water. A known weight of concentrated sulphuric acid was added. The vessel was heated with steam to the target temperature and pressurised with oxygen. The reaction time was 4 hours.

The residue from the pressure acid leach was then subjected to a concentrated sulphuric acid destruct (fusion) by blending with a measured volume of concentrated acid and heated with steam to 300° C. for 1 hour. The leach slurry was diluted with water and filtered.

The conditions for the pressure acid leach and fusion are shown in Table 16.

TABLE 16

Leach and Fusion Tests Conditions.

| | Leach (3 hours) | | | | Fusion (1 hour) | | Overall |
|---|---|---|---|---|---|---|---|
| Test | Temp °C. | Pres kPa(g) | $H_2O_4$ Ratio | Mass Reduction | Temp °C. | Mass Reduction | Mass Reduction |
| 1 | 180 | 1500 | 1.10 | 91.8 | 300 | 95.5 | 99.7 |
| 2 | 180 | 1500 | 1.68 | 88.3 | 300 | 98.5 | 99.8 |
| 3 | 180 | 1200 | 1.50 | 88.8 | 300 | 95.9 | 99.6 |
| 4 | 180 | 1500 | 1.08 | 94.2 | 300 | 94.4 | 99.8 |

The results are summarised in Tables 16 and 17. It can be seen that greater than 99% mass reductions were achieved with final concentrate analyses as follows:

| Pt | 6-25% |
|---|---|
| Pd | 8-20% |
| Au | 0.01-0.04% |

TABLE 17

Analyses of products produced during Leaching and Fusion

| Test | Stream | Pt (ppm) | Pd (ppm) | Au (ppm) |
|---|---|---|---|---|
| 1 | Leach feed | 1100 | 1200 | 9.77 |
| | Leach residue/Fusion feed | 11500 | 12400 | 15.6 |
| | Fusion residue | 250000 | 199000 | 371 |
| 2 | Leach feed | 1100 | 1200 | 10.7 |
| | Leach residue/Fusion feed | 12300 | 12900 | 3.63 |
| | Fusion residue | \multicolumn{3}{c}{Insufficient sample} |
| 3 | Leach feed | 1100 | 1090 | 9.66 |
| | Leach residue/Fusion feed | 10600 | 11800 | 5.27 |
| | Fusion residue | 61100 | 85200 | 109 |
| 4 | Leach feed | 1100 | 1090 | 9.66 |
| | Leach residue/Fusion feed | 20100 | 24500 | 11 |
| | Fusion residue | 121000 | 173000 | 165 |

EXAMPLE 11

Upgrade Process for Acidification Residue

This test, run as a pilot campaign, illustrates the upgrade process for the precipitate produced from the pH2 acidification of cyanide solution.

Figure 13:
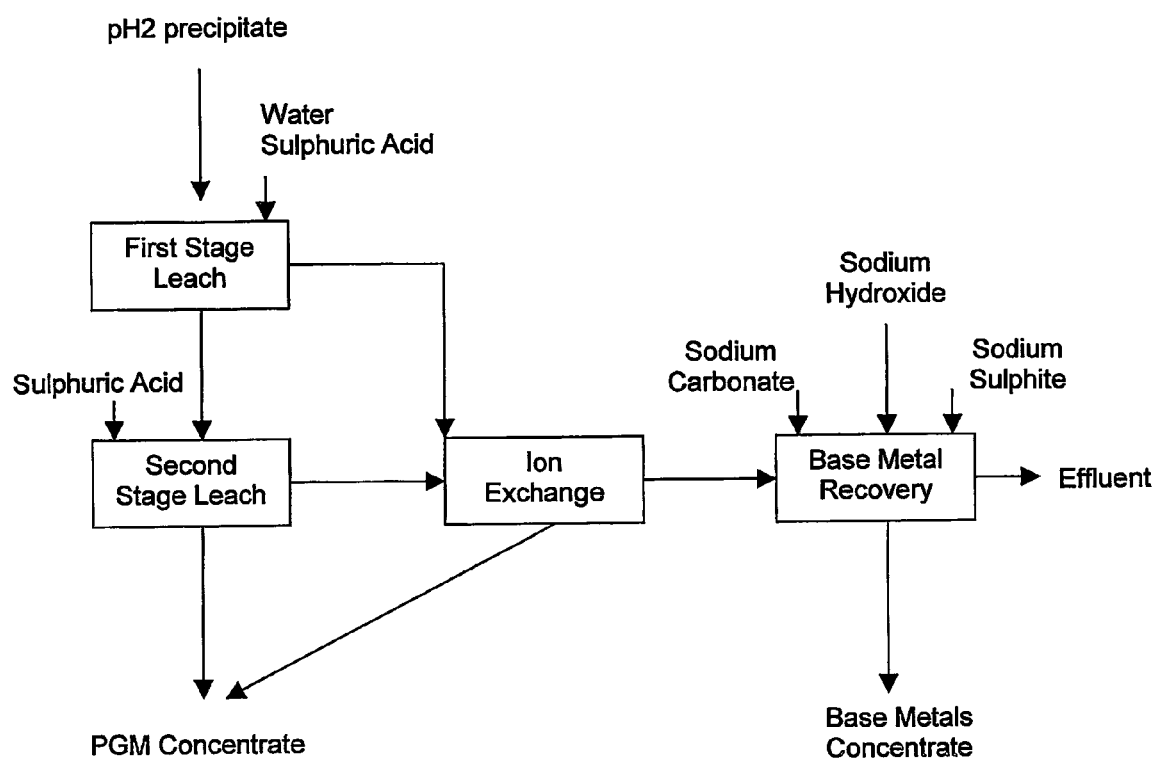
FIG. 13 is a flow sheet of a pilot campaign for treating a pH2 precipitate.

The precipitate as produced in Example 6 was repulped in sulphuric acid, water and a lixiviant sourced from the second stage leach. The slurry was fed to the first stage leach. The flowsheet employed in this pilot campaign is shown in FIG. 13.

The first stage leach was an oxidative pressure leach with counter current oxygen flow. The vent gas was scrubbed to recover hydrogen cyanide that was not destroyed in the autoclave. The operating conditions for this stage leach were as follows:

| Total pressure | 1500 kPa(g) |
|---|---|
| Oxygen partial pressure | 450-500 kPa(g) |
| Temperature | 180° C. |
| Slurry pH | 0.7-0.8 |
| Retention time | 2.5 h |
| Feed rate | 0.25 kg/h |
| Number of compartments | 1 |

The mass reduction was only 80% (possibly due to only one compartment). The first stage residue was blended with sulphuric acid, leached at approximately 300° C. in mild steel vessels and then quenched in water at 90° C. The conditions for the second stage of leaching were as follows:

| | |
|---|---|
| Pressure | Atmospheric |
| Temperature | 290-310° C. |
| Retention time | 1 h |
| Water quench temperature | 90° C. |
| Water quench retention time | 1 h |
| Sulphuric acid/residue | 3.6 |

The residue from the second stage leach was the final concentrate with a typical analysis at steady state as shown in Table 18

TABLE 18

Final Concentrate Analysis

| | % |
|---|---|
| Ni | 0.2 |
| Cu | 0.4 |
| Fe | 0.5 |
| Co | 0.5 |
| Pt | 36.7 |
| Pd | 43.8 |
| Au | 0.1 |
| Rh | 0.04 |
| Ru | 0.01 |
| Ir | 0.02 |
| S | 0.4 |
| Se | 1.0 |
| Te | 0.02 |
| $SiO_2$ | 1.8 |

The PGM split between first stage leachate and the final concentrate is shown in Table 19.

TABLE 19

Recovery of PGMs to outlet streams

| | To Concentrate % | To Leachate % |
|---|---|---|
| Pt | 99.64 | 0.36 |
| Pd | 99.63 | 0.37 |
| Au | 59.1 | 40.9 |

The final concentrate contained well in excess of 99% of the PGMs in the leach feed at a grade of greater than 80% total PGMs. Less than 0.1% of the base metals in the leach feed reported to the final concentrate.

The first stage leachate was conditioned with sodium chloride at approximately 15 g/l and then passed through pilot ion exchange columns filled with IRA-402 in the first, second and fourth columns and activated carbon in the third column. The raffinate values were typically 10 ppb for each element and the load distribution is given in Table 20.

TABLE 20

Ion Exchange columns loading distribution

| | Metal Distribution % | | |
|---|---|---|---|
| | Pt | Pd | Au |
| Column 1 | 97.4 | 98.5 | 24.3 |
| Column 2 | −0.3 | 0.07 | −2.2 |
| Column 3 | 0.9 | — | 1.6 |
| Column 4 | 0.7 | — | 5.8 |

Only minor quantities of base metals were loaded on the resin whilst an overwhelming majority was taken to a carbonate precipitation with a composition shown in Table 21.

TABLE 21

Base Metal residue analysis

| | % |
|---|---|
| Cu | 12-18 |
| Ni | 22-30 |
| Fe | 05.-1.5 |
| Co | 0.15-0.20 |
| Pt | <0.0010 |
| Pd | <0.0005 |
| Au | <0.00001 |
| Rh | <0.0001 |
| Ru | <0.0001 |
| Ir | <0.0005 |
| As | <0.0005 |
| Na | ~2.0 |

The invention claimed is:

1. A process of recovering platinum group metals (PGMs) from a pregnant solution or leachate containing PGM values and base metals, the process including the steps of:
   a) non-selective precipitation of the PGM values and base metals to form an insoluble precipitate comprising the PGM values and base metals;
   b) selective leaching of the precipitate to form (i) a leach solution containing the base metals and a residue containing the PGM values, or (ii) a leach solution containing the base metals and PGM values and a depleted residue; and
   c) recovery of the base metals from the leach solution of b)(i) or b)(ii) and recovery of the PGM values from the residue of b)(i) or the leach solution of b)(ii), depending on the selective leaching in step b),
   wherein the pregnant solution or leachate containin the PGM values and base metals is a cyanide solution or leachate.

2. A process according to claim 1, wherein the non-selective precipitation of the PGM values and base metals in step a) is carried out by controlled reduction of the pH of the pregnant solution or leachate to within the range of about 0 to about 5.

3. A process according to claim 2, wherein the pH of the pregnant solution or leachate is reduced to within the range of about 1 to about 3.

4. A process according to claim 3, wherein the pH of the pregnant solution or leachate is reduced to about 2.

5. A process according to claim 1, wherein the selective leaching in step b) is a pressure leaching step in which the PGM values remain in the residue.

6. A process according to claim 5, wherein the PGM values are recovered from the residue by a fusion step or a further leach step to produce a concentrate rich in PGM values.

7. A process according to claim 5, wherein the pressure leaching step is conducted by first carrying out a caustic leach followed by an acid leach.

8. A process according to claim 7, wherein the PGM values are recovered from the residue by a reduction leach step to produce a high grade PGM concentrate.

9. A process according to claim 1, wherein the insoluble precipitate of step a) is fumed with acid, followed by selective leaching to form a leach solution containing both the PGM values as anions and the base metals as cations, and recovery of the PGM values on an ion exchange resin.

10. A process according to claim 9, wherein the resin is incinerated to form an ash rich in PGM values or eluted to recover the PGM values.

11. A process according to claim 1, wherein the insoluble precipitate of step a) is first calcined prior to selective leaching in step b), producing a PGM rich residue or concentrate.

12. A process according to claim 1, wherein the base metals are recovered from the leach solution of b)(i) or b)(ii) by precipitation.

13. A process according to claim 1, wherein any PGM values remaining in solution after the non-selective precipitation in step a) may be recovered by passing the solution through an ion exchange resin.

14. A process according to claim 13, wherein the resin is incinerated to form an ash rich in PGM values or eluted to recover the PGM values.

* * * * *